(12) United States Patent
Cattin et al.

(10) Patent No.: US 8,224,618 B2
(45) Date of Patent: Jul. 17, 2012

(54) DEVICE AND METHOD FOR DETECTING THE PATH OF AN OBJECT MOVING IN TWO DIMENSIONS

(75) Inventors: Viviane Cattin, Saint Egreve (FR); Franck Vial, Paladru (FR); Marie-Cecile Maillot, Valence (FR)

(73) Assignee: Commissariat a l'Energie Atomique, Paris (FR)

( * ) Notice: Subject to any disclaimer, the term of this patent is extended or adjusted under 35 U.S.C. 154(b) by 318 days.

(21) Appl. No.: 12/527,610

(22) PCT Filed: Feb. 19, 2008

(86) PCT No.: PCT/EP2008/052004
§ 371 (c)(1),
(2), (4) Date: Aug. 18, 2009

(87) PCT Pub. No.: WO2008/101925
PCT Pub. Date: Aug. 28, 2008

(65) Prior Publication Data
US 2010/0082288 A1   Apr. 1, 2010

(30) Foreign Application Priority Data
Feb. 19, 2007   (FR) ...................................... 07 53343

(51) Int. Cl.
*G01C 19/00* (2006.01)
(52) U.S. Cl. ........................................................ 702/150
(58) Field of Classification Search .................. 702/150, 702/182; 701/213, 217; 324/426
See application file for complete search history.

(56) References Cited

U.S. PATENT DOCUMENTS

| 4,991,126 A | 2/1991 | Reiter |
| 5,583,776 A | 12/1996 | Levi et al. |

(Continued)

FOREIGN PATENT DOCUMENTS

CN   1678884 A   10/2005
(Continued)

OTHER PUBLICATIONS

Michael Wynn, "Detection, Localization, and Characterization of Static Magnetic-Dipole Sources", Detection and Identification of Visually Obscured Targets, edited by Carl E. Baum, Chapter 11, Oct. 1, 1998, 21 pages.

(Continued)

*Primary Examiner* — Bryan Bui
(74) *Attorney, Agent, or Firm* — Oblon, Spivak, McClelland, Maier & Neustadt, L.L.P.

(57) ABSTRACT

A method of reconstructing, in two dimensions, a path of a living being or of an object moving, by a repetitive movement, in a plane or a two-dimensional surface or along a plane or a two-dimensional surface, including: measuring at least two variable components of the projection of the terrestrial magnetic field on at least two axes of a biaxial or triaxial magnetometer connected to or situated on the living being or object, measuring the period, or frequency, of a signal corresponding to the measurement of at least one of the variable components along one of the axes of the magnetometer, measuring the heading, or direction, of the movement, from at least two field measurements along at least two axes of the magnetometer, and reconstituting the path from the measurements of period or frequency and of heading or direction.

19 Claims, 3 Drawing Sheets

U.S. PATENT DOCUMENTS

| | | |
|---|---|---|
| 5,807,283 A | 9/1998 | Ng |
| 6,122,960 A | 9/2000 | Hutchings et al. |
| 6,132,391 A | 10/2000 | Onari et al. |
| 6,522,266 B1 | 2/2003 | Soehren et al. |
| 6,865,455 B1 * | 3/2005 | Wiegert .................... 701/23 |
| 7,571,847 B2 | 8/2009 | Lee et al. |
| 2006/0111843 A1 | 5/2006 | Lee et al. |
| 2006/0152212 A1 | 7/2006 | Beranger et al. |
| 2007/0260418 A1 * | 11/2007 | Ladetto et al. ............... 702/150 |
| 2008/0246467 A1 | 10/2008 | Vial et al. |

FOREIGN PATENT DOCUMENTS

| | | |
|---|---|---|
| CN | 1776371 A | 5/2006 |
| DE | 101 17 920 A1 | 10/2002 |
| EP | 1 536 207 A1 | 6/2005 |
| FR | 2 856 145 | 12/2004 |
| FR | 2 887 980 | 1/2007 |
| WO | WO 01/88477 A2 | 11/2001 |
| WO | WO 01/88477 A3 | 11/2001 |
| WO | WO 2004/020951 A1 | 3/2004 |
| WO | WO 2004/077374 A1 | 9/2004 |
| WO | WO 2005/034751 A2 | 4/2005 |
| WO | WO 2005/091113 A2 | 9/2005 |
| WO | WO 2005/091113 A3 | 9/2005 |

OTHER PUBLICATIONS

Office Action issued Dec. 14, 2010 in China Application No. 200880011336.0 (With English Translation).

* cited by examiner

DEVICE AND METHOD FOR DETECTING THE PATH OF AN OBJECT MOVING IN TWO DIMENSIONS

TECHNICAL FIELD

The invention concerns the field of communicating objects and magnetic metrology applied to the capture of sporting, medical or industrial movement.

It concerns in particular the measurement of the periodic (or pseudo-periodic) movement of the walking of a person. It allows the conjoint measurement of the orientation and pace, or periodicity, of this movement.

More generally the invention applies to the repetitive movement of a walker or an object moving in a plane or a two-dimensional surface or along a plane or a two-dimensional surface.

At the present time many objects become "intelligent" by means of the insertion of electronic elements performing certain functions of communication with the environment. In the field of sport, for example, equipped shoes perform very simple functions, such as for example the illumination of LEDs, at regular intervals or when the foot performs a certain action (stepping, running or jumping).

In the field of health, our characteristic sedentary lifestyle gives rise to an increasing interest in walking. Many persons use a pedometer daily for evaluating their exercise. This equipment estimates the distance travelled daily or in a given interval of time and derives therefrom the level of physical activity of its wearer.

The majority of systems used in pedometers consist of accelerometers. These sensors provide a periodic acceleration signal with the walking movement. More or less sophisticated processing operations make it possible to detect and count the steps (and thus to derive the distance travelled by prior calibration of the length of step) or to estimate the length of the step in real time.

In the document U.S. Pat. No. 5,583,776, the signal of an accelerometer placed vertically at the foot is used, by means of processing operations of the thresholding and/or frequency analysis types, to estimate the distance travelled. This device, coupled with a compass or GPS, forms a navigation system based on walking.

A measurement of acceleration is a quantity related to the terrestrial gravitation field and to the speed of movement. Other processing operations therefore seek to isolate, with greater or lesser success, the acceleration particular to the movement, and then integrate the signal in order to derive the distance (with the risks of drift caused by double integration).

If it is very sensitive to the speed of the movement and to all the vibrations that the sensor undergoes during the movement, the trend of the accelerometric signal does not depend on the direction of the walking. The system is therefore intrinsically robust vis-à-vis the heading followed by the walker. On the other hand, the heading is not accessible via this type of measurement.

A magnetometry measurement corresponds on the other hand to the projection of the terrestrial magnetic field on the sensitive axis of the sensor: it is therefore related to the path followed by the sensor in the ambient magnetic field. For a walking or running movement, the trend of the periodic signal no longer depends on the speed of movement or the hardness of the ground but changes according to the orientation of the heading of the sensor. Magnetometers are because of this normally used for estimating the heading but never for estimating the number of steps or the distance travelled from the terrestrial magnetic field.

Some inventions, and in particular that described in U.S. Pat. No. 6,132,391, use magnetometers for determining the direction of the walking, often accompanied by a global positioning system (of the GPS type).

Other works mention the use of a magnetic measurement for deriving the distance travelled, but these systems all involve a complementary magnetic source, placed in a first shoe, and a magnetic sensor situated in the second shoe in order to limit the variability of the signal. The processing operations used are then more or less complex (thresholdings, calibration) for estimating the number of steps, the length of the stride and the distance travelled, as described for example in WO 2005/034751.

To provide both the number of steps (for the distance travelled by virtue for example of a prior calibration of the length of step) and the heading, the previous inventions require the use of two types of measurement (accelerometers and magnetometers).

To summarise, methods of measuring distance by means of accelerometers are therefore known.

The use of invasive magnetic systems are also known with a magnetic source that has to be implanted in an object, on moving objects in order to obtain movement characteristics (distance, speed, etc).

The measurements obtained with these known techniques require the two types of sensor for obtaining the two types of measurement, distance and heading.

DISCLOSURE OF THE INVENTION

A method according to the invention makes it possible to perform a reconstruction or a projection, in two dimensions, of the path of a living being or of an object moving, by a repetitive movement, in a plane or a two-dimension surface or along a plane or a two-dimensional surface.

This method comprises the following steps:

measuring at least two components of the projection of the terrestrial magnetic field on at least two axes of a biaxial or triaxial magnetometer connected to, or situated on, the living being or the object; at least one of these components is variable, possibly both are variable, detecting occurrences of the repetitive movement from the measurement of at least one of said components, variable, along one of the axes of said magnetometer, or measuring the period, or frequency, of a signal corresponding to the measurement of at least one of said components, variable, along one of the axes of said magnetometer, measuring the heading, or direction, of the movement, from at least two field measurements along at least two axes of said magnetometer, reconstituting said path from the occurrences detected and the measurements of heading or direction or from the measurements on the one hand of period or frequency and on the other hand of heading or direction.

The expression "occurrence" of the repetitive movement means here and hereinafter an elementary phase of the periodic or pseudo-periodic movement, a phase the repetition of which constitutes this movement.

To implement this method, the signal supplied by a magnetometer with two axes as a minimum is used. The walker or animal or moving object is equipped with a magnetic field sensor, for example biaxial or triaxial, in order to obtain on the one hand the frequency or period information, or the information relating to the occurrences of the movement, or distance, and on the other hand heading.

The invention does not use a pedometer, in particular based on an accelerometer, nor an accelerometer.

The detection of the occurrences of the movement, in the above sense, or of the period or frequency of the movement, which contains the information on the pace of the movement studied, then makes it possible if necessary to find the distance travelled in one or more directions of the plane or the two-dimensional space.

The invention solves the problem of the obtaining of two types of measurements, distance and heading, in a simplified fashion using two (or three) sensors or magnetic axes for determining at least the occurrences or pace of the movement (T), without using any information coming from means such as an accelerometer or a pedometer based on an accelerometer. From the pace data it is possible to extract the number of periods.

Directly using the terrestrial magnetic field gives access to the heading of the movement. The same magnetometer can therefore also be used for detecting the heading.

An adaptive processing makes it possible to dispense with the variability of the magnetic signal for determining the pace.

A processing unit makes it possible to process the signal delivered by the sensor. The sensor and the associated electronics can benefit from the advantages of reduction in size associated with microtechnology techniques. Thus a system according to the invention can be associated with a moving object in order to provide it with two functionalities: measurement of occurrence or pace of its movement and measurement of its orientation with respect to magnetic North.

For example, the system according to the invention can be inserted in the heel of a sports shoe in order to provide the heading and pace of the walking (or running).

The system according to the invention can communicate its information (raw or preprocessed measurements) to a display unit, by radio or other link.

The invention also concerns a device for reconstructing or projecting, in two dimensions, the path of a living being or object moving, by a repetitive movement, in a plane or a two-dimensional surface or along a plane or a two-dimensional surface. This device comprises:
  a magnetometer, biaxial or triaxial, for measuring at least two components, at least one of which, and possibly both, is or are variable, of the projection of the terrestrial magnetic field on at least two axes of the magnetometer connected to or situated on the being or object,
  means for detecting occurrences of the repetitive movement from the measurement of at least one of said components, variable, along one of the axes of said magnetometer or means for measuring the period or frequency of a signal corresponding to at least one of said variable components along one of the axes of said magnetometer,
  means for measuring the heading, or direction, of the movement, from at least two field measurements along at least two axes of said magnetometer,
  means for reconstituting said path from on the one hand the period or frequency data and on the other hand heading or direction data or from occurrences detected and heading or direction measurements.

The invention has several advantages:
  The measurement system according to the invention is simple and sparing in energy, since it uses a magnetometer (rather than other types of sensors such as an accelerometer or GPS), for example biaxial.
  The system for measuring the pace according to the invention requires no prior calibration.
  This system is easy to implement since it uses the ambient magnetic field and therefore does not require any artificial magnetic source; in addition, it can be connected to a miniaturised radio transmitter and can remain compact and equip any type of object.

A device according to the invention can also comprise means, for example of the radio type, for communicating data from the magnetometer to a processing and/or display unit.

It can comprise means of processing the magnetometry data.

An example of application of the invention is a shoe comprising a device as described above.

The invention also concerns a locating and/or positioning system, comprising:
  a device according to the invention as described above for reconstructing or projecting, in two dimensions, the path of a living being or object moving, by a repetitive movement, in a plane or a two-dimension surface or along a plane or a two-dimensional surface,
  a positioning device, by satellite or by reference to fixed terrestrial stations,
  the system being programmed so that, when there is an operating failure in the device for positioning by satellite or by reference to fixed terrestrial stations, the measuring device according to the invention is kept in operation or set in operation.

DETAILED DISCLOSURE OF PARTICULAR EMBODIMENTS

Figure 1:
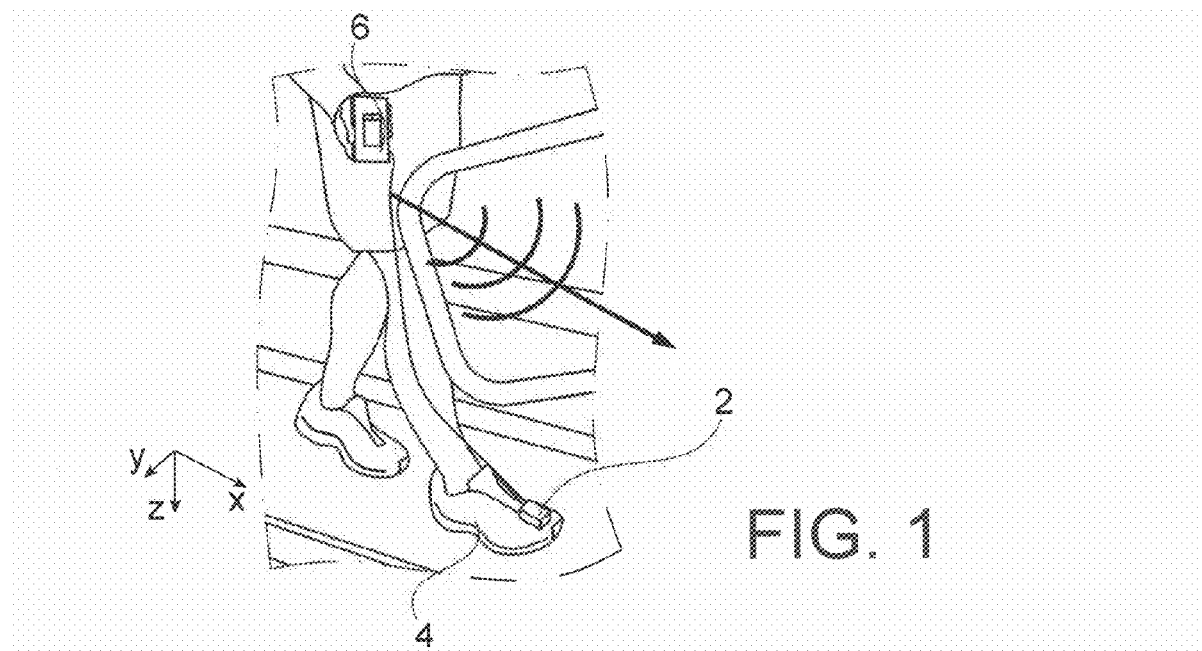
FIG. 1 illustrates the use of a device according to the invention during tests on a shoe.

The invention will first of all be described in the context of an application to a shoe, in relation to FIG. 1, here the shoe of a person exercising on a machine of the type used in sports halls.

As a first approximation, a magnetic sensor (of the fluxgate or GMR type for example) measures the projection of the terrestrial magnetic field on its sensitive axis. Being fixed to the object 4, itself connected to the walker, the sensor follows the periodic movement of this object. Means 6 make it possible to acquire the data of the sensor and possibly to transmit them, for example by a wireless link, to processing and storage means 8.

Figure 2:
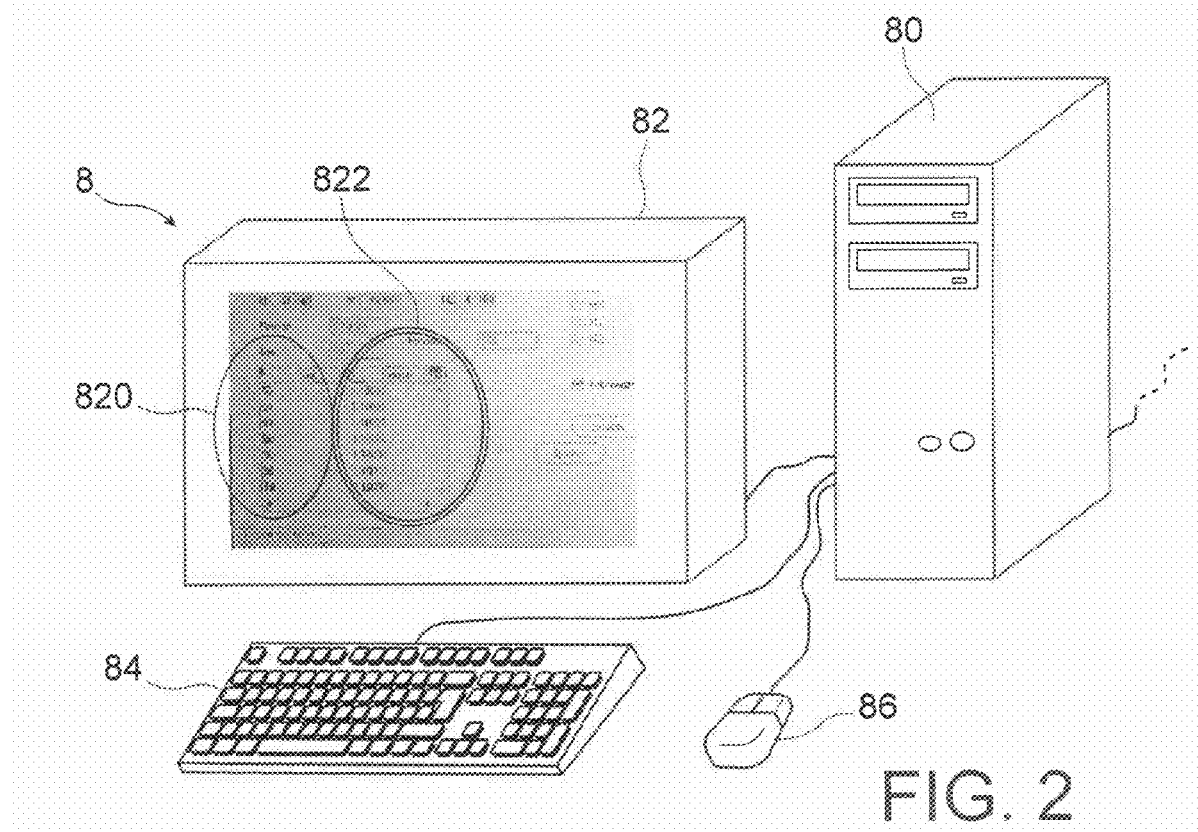
FIG. 2 illustrates a calculation and display unit during the use of a device according to the invention.
Figure 3:
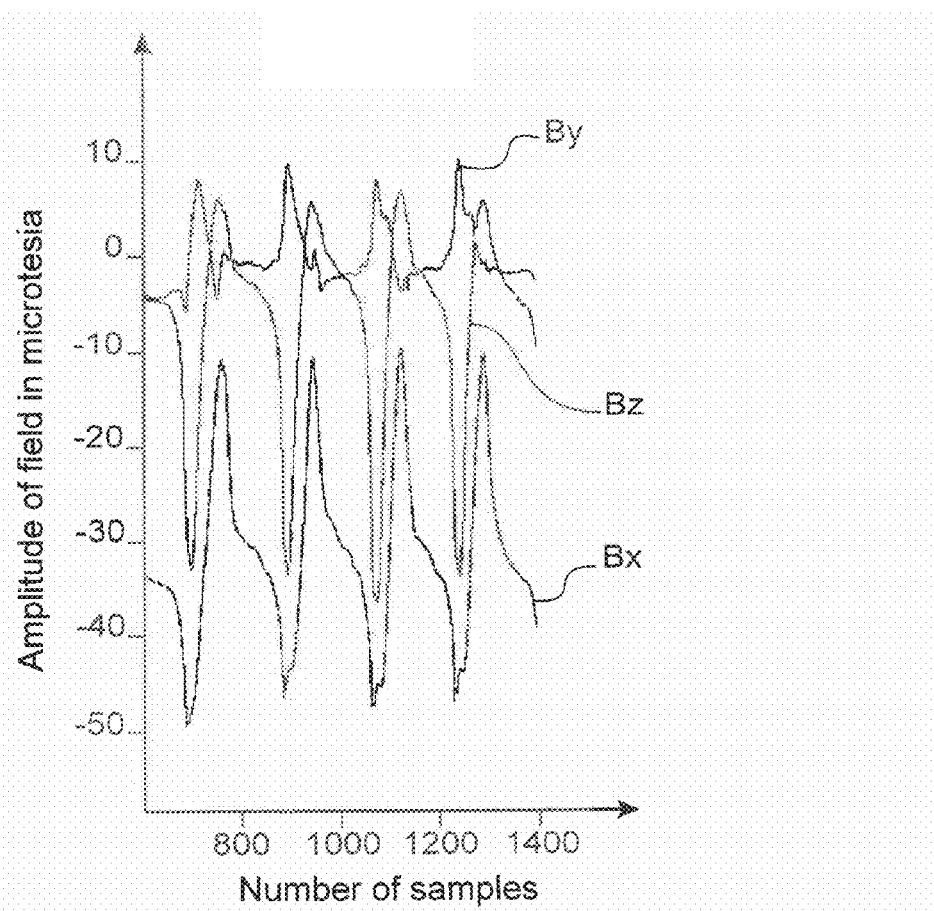
FIG. 3 illustrates the trend of the three components of the magnetic field during walking.

Such processing means 8 are shown in FIG. 2. They comprise a central unit 80, which will make it possible to perform calculations on the data received, and to store said data as well as the calculations made. A display unit 82 makes it possible to display data such as the data received, for example in the form of graphs like the one in FIG. 3, or calculated data like the ones displayed as an example in FIG. 2, for example columns 820 and 822. The data contained in these two columns correspond respectively, in the context of an application to a shoe, to orientation data and to data on the pace of the walking or movement of a user.

The data processing can also be carried out by a portable calculation unit of the processor type, or DSP, etc.

In a variant, at least some of the processing operation or operations can be carried out by means 6 carried by the user in FIG. 1. In this case, the unit 80 is relieved of at least some of the processing operations.

As will be seen subsequently, a method and device according to the invention also make it possible, in general terms, to measure the heading or direction of movement of an object or walker or animal. In general terms, a device according to the invention can therefore comprises means, electronic or computing, implementing data processing for obtaining both the heading, or the orientation data, and the pace data and possibly the speed and/or distance travelled. Such a device can also be provided with display means, for example for assisting a walker to find his way in a particular place towards a precise point. It can be combined with cartography software means.

The field measured by the means 2 has a periodic (or pseudo-periodic, with a slowly variable pace) pattern or at least a variable component. This pattern or variable component corresponds to the variations in the projection of the terrestrial field seen by the moving sensor (see FIG. 3). It can be affected by a noise level depending on the surrounding electromagnetic parasitics.

The pace of movement and the orientation of the sensor can be extracted from this measurement. Other data, for example distance-travelled data, can be calculated or estimated from these pace and/or orientation data.

A frequency analysis technique used can be implemented by the means 80 (FIG. 2) of receiving and processing the data received after transmission by the means 6, or even possibly by the latter themselves.

A device and method according to the invention uses no supplementary device, such as a pedometer or sensor of the accelerometer type. The pedometer implemented with an accelerometer measures a number of steps by counting pulses, for example detected by thresholding. It is in principle difficult to apply this principle to a magnetometer since its signals vary in amplitude with the heading.

It is therefore possible to use techniques that dispense with this variability, for example frequency analysis techniques, which make it possible to determine a pace from a periodic signal (processing by FFT as described for example in U.S. Pat. No. 5,583,776, or by adapted filter, or by wavelets for example).

The signal can be compared continuously with a model: this model is either for example formulated mathematically or formed by the signal itself at a previous instant.

Figure 4:
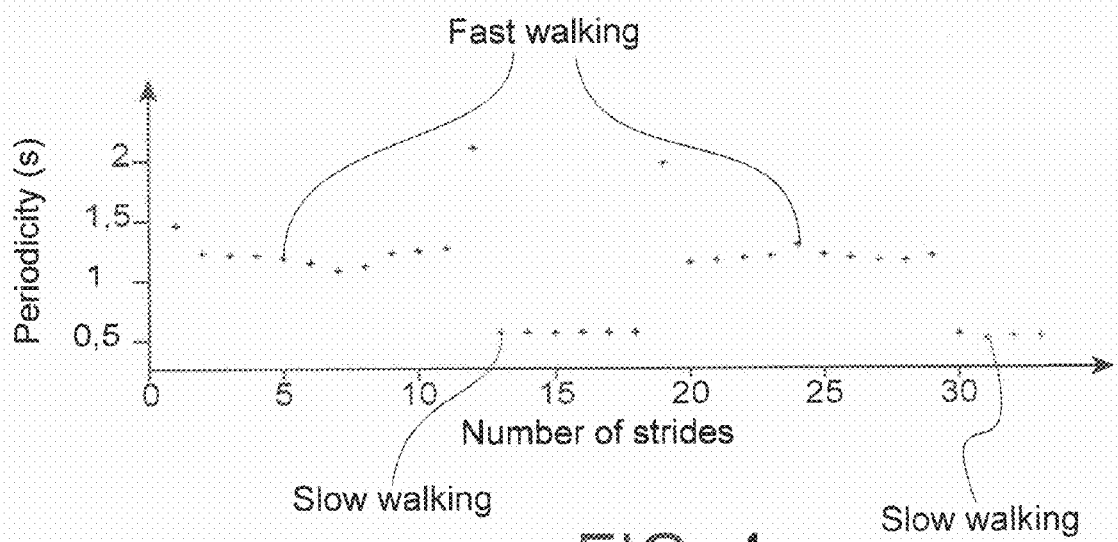
FIG. 4 illustrates the estimation of the walking pace over several steps of a walker, by autocorrelation of a magnetic signal.

An example of an application of the invention to walking with processing based on sliding-window autocorrelations provides the results illustrated in FIG. 4. The principle of this processing is based on the following property of the autocorrelation of a periodic signal: the autocorrelation has maxima at the same pace as the signal whatever the trend of the periodic pattern of the signal.

In order to determine the period the non-zero instant corresponding to the first maximum of the correlation function is measured. More precisely, a signal length L containing at least four periods is selected and then its autocorrelation is calculated; the time corresponding to the first maximum is located by windowing and thresholding: this supplies a first estimation of the pace. This estimation is then used to determine a new length L', calculated so that L' is greater than four times the pace. The calculation method described above is then applied. This method of estimating the pace is therefore looped: the last estimation of the period is used to determine the length of the signal useful to the calculation of the following one. This technique dispenses with the trend of the walking.

The periodicity of the movement appears in FIG. 4 according to the number of strides, that is to say according to the elapse of time. Fast walking rhythms are clearly identified, alternating with slow walking rhythms.

There also, an autocorrelation processing can be implemented by means such as the means 80 illustrated in FIG. 2 or by the portable means 6 (FIG. 1). Autocorrelation does not use a mathematical model of the shape of the signal. If the observation window is fairly long, the periodic character of the signal dominates the variations in trend related to the heading and the autocorrelation supplies a good estimation of the pace, independently of the heading.

Used on a fairly long observation window, the invention makes it possible to dispense with the variations in trend of the signal relating to the heading.

As for the orientation of the sensor, this is the angle between the horizontal component of the magnetic field and geographic North. This angle can be determined from the three field measurements of a triaxial sensor, or the two field measurements of a biaxial sensor, for example by thresholding. In the case of a walker, this sensor is preferably placed parallel to the foot. It makes it possible to locate, for example by thresholding, the temporal range corresponding to the horizontal position of the foot. For example, by thresholding of the signals Bx and By of FIG. 3, this range corresponds to the zone with the gentlest slope of the two signals.

Figure 5A:
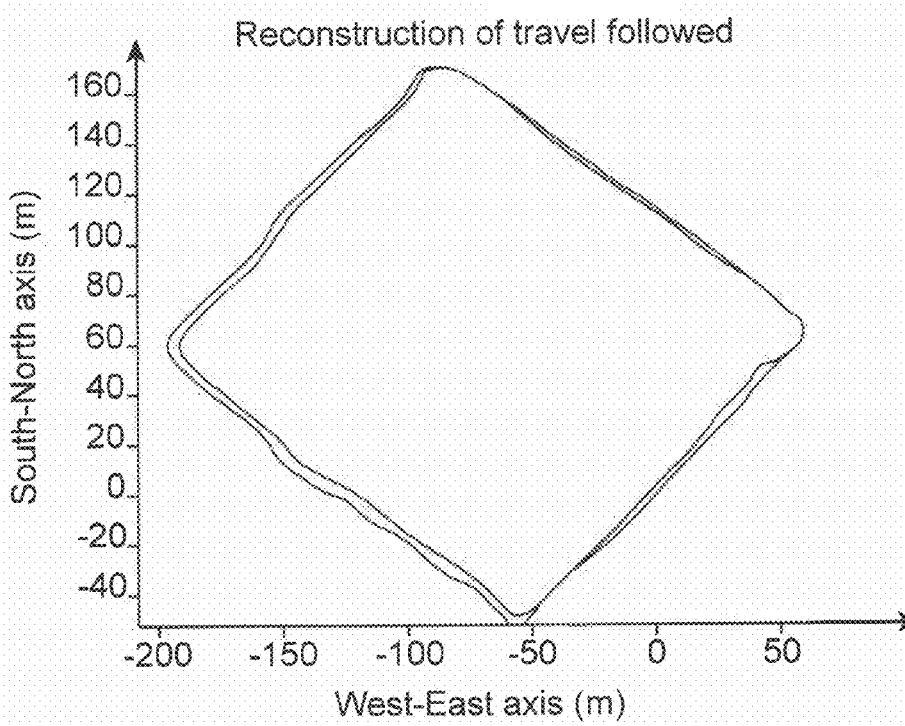
FIGS. 5A and 5B show two paths reconstructed from measurements made according to the invention.
Figure 5B:
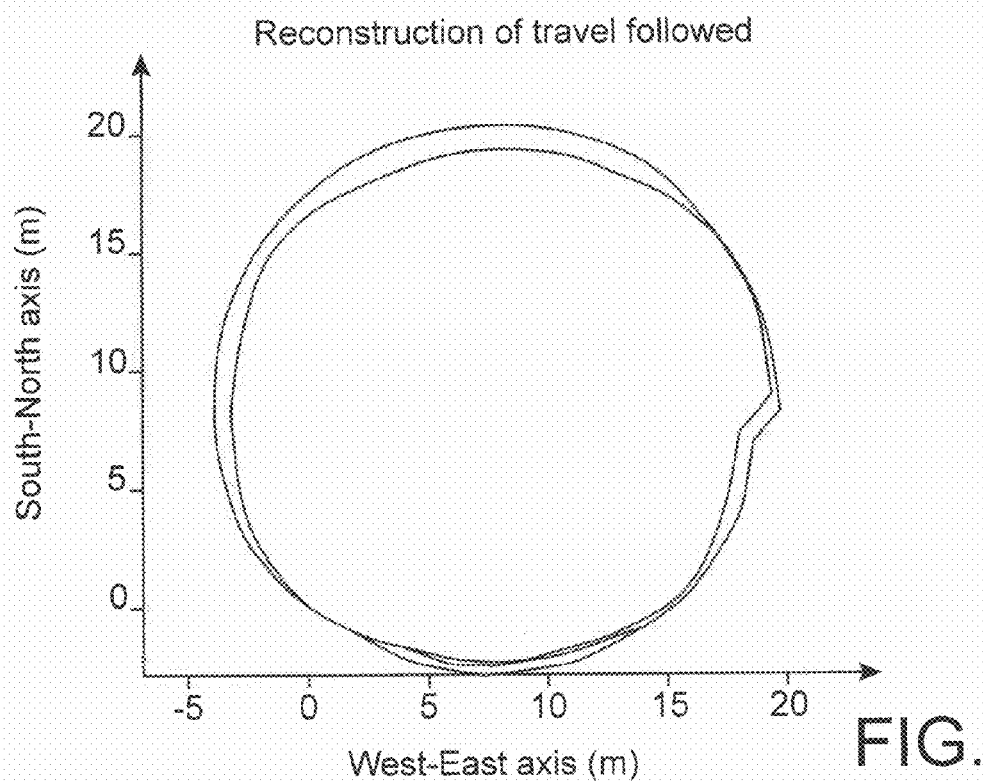

A fusion of the data, on the one hand of heading or orientation and on the other hand of pace or rhythm, can be performed. From the pace or rhythm information (the number of occurrences of the movement for travelling a given distance), it is possible to determine the distance associated with a single occurrence of the movement. The distance and heading information is then combined in order to estimate, for example at each instant, and with respect to each of the two directions chosen in 2D, the distance travelled in the current direction. Thus there are shown in FIGS. 5A and 5B the results obtained for two types of travel, a first travel (FIG. 5A) rectangular and repeated twice, a second travel (FIG. 5B) circular and also repeated twice. In each of these figures, a reconstructed path is given in a reference frame where the x axis is the West-East direction and the y axis the South-North direction.

More generally, the invention makes it possible to provide a visual representation of the path of an object, a path the components of which are located along two directions of the plane or surface in or on which the object moves.

The basic system described in the invention can be enhanced in order to provide complementary functions, which can also be implemented by the means 80 or by the portable means 6 in FIG. 2.

For example, a "counter" function can be implemented: determining the pace T makes it possible to count the number of occurrences of the periodic movement N. In the case of walking, one step per period is counted.

A "pedometer" function can be implemented from knowledge of the number of occurrences of the movement N that makes it possible, after calibration by the user, to determine a particular characteristic of the movement. For example for running, the distance travelled D is supplied from a calibrated stride length L:

$$D = N*L.$$

The length of the stride L is a parameter entered by the user or calculated during a phase of calibration of the apparatus (regular walking practiced over a predetermined known distance).

If the length of the stride is poorly estimated after calibration, an error is introduced on the distance at each step. It may then be necessary to manage a drift that results in a bias increasing over time between the actual position and the position estimated by the method according to the invention. One way of improving the device is to reset it or reposition it regularly by means of data such as:

positioning data, for example by GPS, when such a positioning device is operational, data supplied by a geo-referenced database of the places and that can provide information to the device according to the invention. For example, when a movement is made in a building and the estimated path takes place in this place, it is possible to reset the passage of the person to the middle of a door rather than through a wall.

If several measurement axes are used, and a magnetic source (dipolar or not) is added close to the movable object, then an estimation of the path of the object (position and/or altitude) with respect to the position of this source (or vice versa) can also be made by means of the known techniques of magnetic measurement inversion (optimisation, Kalman filter, for example described in C P Frahm "Inversion of the magnetic field gradient equations for a magnetic dipole field" NCSL Informal Report 135-72, 1972). By placing, for example, a magnetic sensor (a magnetic gradient meter, which uses the measuring technique described in the above document) on one foot and a magnet on the other, it is possible, by means of these inversion techniques, to estimate the path of one foot with respect to the other and thus determine in real time the length of the stride. This approach is more precise than the calibration of the length of the step mentioned previously.

A method and device according to the invention as described above use a measurement of the period or frequency of the movement, after measuring a variable component of the magnetic field.

More simply, from the same magnetic field data as above, it is possible to apply a thresholding (simple, or of the hysteresis type in order to be more robust) to the signal resulting from the measurement of the variable component of the magnetic field. Then the identification of each occurrence of the periodic or pseudo-periodic movement or of each elementary phase of this movement is obtained, as soon as the signal exceeds a certain threshold value. It is thus possible to count the number of elementary movements. Knowing the distance associated with an elementary movement, the total distance travelled is derived from this. The signal may be preconditioned in order (at least partially) to be free of its variability, for example by standardising the signal on a sliding window (the minimum of the signal is forced in this window to 0 and the maximum to 1). Such a processing is not necessarily very robust but gives correct results. Moreover, in this embodiment, the heading measurement is identical to that already described previously. It is possible there also to reconstitute a path, as in FIGS. 5A and 5B for example. The distance and heading information is then combined in order, for example at each instant, and with respect to each of the two directions chosen in 2D, to estimate the distance travelled in the current direction. There again, the invention makes it possible to provide a visual representation of the path of an object, a path the components of which are located along two directions of the plane or the surface in or on which the object is moving.

Whatever the embodiment, a portable device according to the invention can be carried on a person or animal or even a walking robot. It is then secured to the person or animal or robot. It makes it possible to reconstruct the path, on the ground, of the wearer and if necessary to display this path on a display screen, for example in the form of the graphs in FIGS. 5A and 5B. The measurement principle functions all the better when the wearer makes a "rubbed" (regular) advance rather than "sliding" on the ground. Walking, running on foot, trotting and galloping are movements that can be processed by a method and device according to the invention.

A device according to the invention can be associated with a locating or positioning device e.g. of the GPS type. In a variant it may be a device for locating by reference to fixed terrestrial stations, of the UWB radio positioning or UWB radio location type. When the latter is not operational, because of conditions such as a loss of satellites, or in the case of a situation within buildings, or in a forest, or in a street hemmed in between large buildings, a device according to the invention provides a user with information on the one hand on heading or direction and on the other hand on pace or rhythm or speed. The system as a whole can be programmed so that, when there is a failure in operation of the locating or positioning device, the device according to the invention is kept in operation or set in operation.

A device according to the invention, for example coupled to a positioning system as explained above, can also be associated with cartography software.

Such a device may be useful for helping a walker to find his way in a particular place, towards a precise point.

One example of use is as follows:

A user has a system comprising a device according to the invention and a location device of the GPS type.

This user has his wireless telephone equipped with a contactless data transmission means (of the Bluetooth type for example).

He approaches, at the entrance to a large covered shopping centre, the information terminal for access to the mall and the plan of this mall.

Automatically, the plan is transferred into a vectorial format (svg format for example) on the wireless telephone of the user, who sees this plan displayed on its screen, with a red dot (which means "you are here!") positioned where the terminal is situated.

The positioning means of the GPS type are inoperative since the satellites are not visible in the store.

The mobile (not seeing the satellites) automatically switches into "relative" positioning mode by means of the magnetometer.

The person wishes to go to the other end of the mall, to a required destination, to a shoe shop for example. He points to the place on the map. The application then knows the global heading, with respect to North, that it is necessary to take. The walker can align his position and the objective with his real direction.

All that he needs to do now is to move forwards in order to move the point, which locates him at each moment until he arrives at the required destination.

The invention has been described in the context of the movement of a walker but applies also to the movement of an animal. The movement of a living being, human or animal, takes place substantially on or in a horizontal plane or on a two-dimensional space. It also applies to the characterisation of the movement of an object, in a plane or surface or along a plane or surface.

The invention claimed is:

1. A method of reconstructing, in two dimensions, a path of a living being or an object moving, by a repetitive movement, in a plane or a two-dimensional surface or along a plane or a two-dimensional surface, comprising:
    measuring at least two components of the projection of the terrestrial magnetic field on at least two axes of a biaxial or triaxial magnetometer connected to or situated on the living being or object;
    detecting occurrences of repetitive movement from the measurement of at least one of the components, variable, along one of axes of the magnetometer;
    measuring the heading, or direction, of the movement, from at least two field measurements along at least two axes of the magnetometer; and
    reconstituting the path from the occurrences detected and the heading or direction measurements.

2. The method according to claim 1, the path being reconstructed from the occurrences detected, the distance travelled per occurrence, and heading or direction measurements.

3. The method according to claim 1, further comprising detecting the period, or the frequency, of the signal corresponding to the measurement of the variable component.

4. The method according to claim 3, a number of occurrences of the repetitive movement being determined from a period.

5. The method according to claim 1, the measurement of the projection of the terrestrial magnetic field being made continuously.

6. The method according to claim 5, further comprising processing the measurements of the projection of the terrestrial magnetic field, the processing comprising comparing the measured signal with a mathematical model or with a signal measured at a previous instant.

7. The method according to claim 6, the comparison being made by autocorrelation, or by FFT, or by adapted filter, or by wavelets.

8. The method according to claim 1, in which a looped estimation method is used, using the last estimation of the period for determining the length of the signal useful for calculation of the following one.

9. The method according to claim 1, in which a magnetic source is disposed close to the being or movable object, the method further comprising estimating the relative path, in terms of position and/or attitude, with respect to the magnetic source.

10. The method according to claim 9, the estimation of the relative path using a magnetic measurement inversion by optimization, or Kalman filter.

11. The method according to claim 1, in which the device is reset or repositioned by positioning data.

12. A device for reconstructing, in two dimensions, a path of a living being or an object moving, by a repetitive movement, in a plane or a two-dimensional surface or along a plane or a two-dimensional surface, the device comprising:
    a biaxial or triaxial magnetometer for measuring at least two components of the projection of the terrestrial magnetic field on at least two axes of the magnetometer connected to or situated on the being or object;
    data processing means to detect occurrences of repetitive movement from the measurement of at least one of the components, variable, along one of the axes of the magnetometer;
    data processing means to measure the heading, or direction, of the movement, from at least two field measurements along at least two axes of the magnetometer; and
    data processing means to reconstruct the path from the occurrences detected and the heading or direction measurements.

13. The device according to claim 12, the data processing means to detect occurrences of the repetitive movement comprising means for measuring the period, or frequency, of a signal corresponding to the variable component.

14. The device according to claim 12, further comprising means for communicating data from the magnetometer to a processing and/or display unit.

15. The device according to claim 14, the means for communicating data comprising means for radio communication of the data from the magnetometer to the reprocessing and/or display unit.

16. The device according to claim 12, further comprising data processing means to process the magnetometry data.

17. A shoe comprising a device according to claim 12.

18. A locating and positioning system, comprising:
    a device for measuring the period, or frequency, and the heading, or direction, of the repetitive movement of a living being or object moving in a plane or a two-dimensional surface or along a plane or a two-dimensional surface, according to claim 12;
    a device for positioning by satellite or with reference to fixed terrestrial stations, or of UWB radio-positioning or UWB radio-location type; and
    the system being programmed so that, when there is an operating failure of the satellite positioning device, the measuring device is kept in operation or set in operation.

19. A device for reconstructing, in two dimensions, a path of a living being or an object moving, by a repetitive movement, in a plane or a two-dimensional surface or along a plane or a two-dimensional surface, the device comprising:
    a biaxial or triaxial magnetometer for measuring at least two components of the projection of the terrestrial magnetic field on at least two axes of the magnetometer connected to or situated on the being or object; and
    a processor device configured to detect occurrences of repetitive movement from the measurement of at least one of the components, variable, along one of the axes of the magnetometer, to measure a heading, or direction, of the movement, from at least two field measurements along at least two axes of the magnetometer, and to reconstruct the path from the occurrences detected and the heading or direction measurements.

* * * * *